United States Patent [19]

van Zelm

[11] 4,374,600
[45] Feb. 22, 1983

[54] LOCK-TYPE GRIPPING DEVICE FOR HANDICAPPED PERSONS

[76] Inventor: Willem D. van Zelm, 1005 Boyce Ave., Baltimore, Md. 21204

[21] Appl. No.: 182,960

[22] Filed: Sep. 2, 1980

[51] Int. Cl.³ .................. B25J 17/00; F16C 11/10
[52] U.S. Cl. ................................. 294/19 R; 294/22
[58] Field of Search ............. 294/19 R, 11, 20, 22, 294/50.5, 50.6, 50.8, 50.9, 65.5, 100, 104, 106, 110 A, 115; 403/93, 91, 97, 157

[56] References Cited

U.S. PATENT DOCUMENTS

| | | | |
|---|---|---|---|
| 3,199,905 | 8/1965 | Johnson | 294/19 R |
| 3,986,743 | 10/1976 | Bjurling et al. | 294/19 R |
| 4,231,603 | 11/1980 | van Zelm | 294/19 R |

*Primary Examiner*—James B. Marbert
*Attorney, Agent, or Firm*—Walter G. Finch

[57] ABSTRACT

The invention is an improved lock for a gripping device, for use by handicapped persons, with a lock-type member to improve safety. The gripping device consists of double acting jaws that grips the item to be picked up or lifted, a forward arm section, a rearward arm section, and a control mechanism to control the gripping action of the double acting jaws and the hinge action between the forward arm section and the rearward arm section. A lock-type safety member for the hinge action improves the safety factor when using the device. The device with the lock-type safety member can be operated with one hand. It can also be operated from a wheel chair.

6 Claims, 7 Drawing Figures

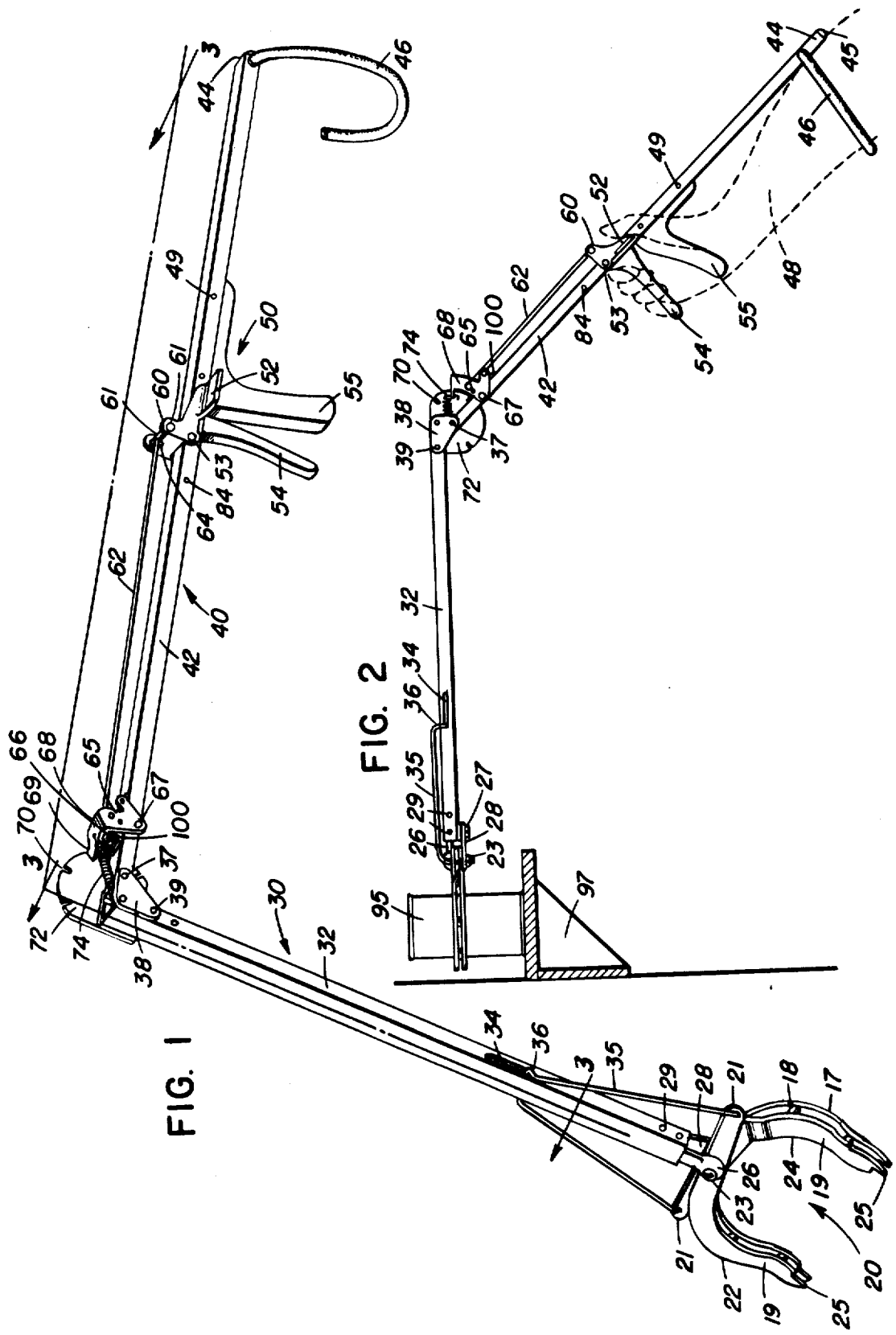

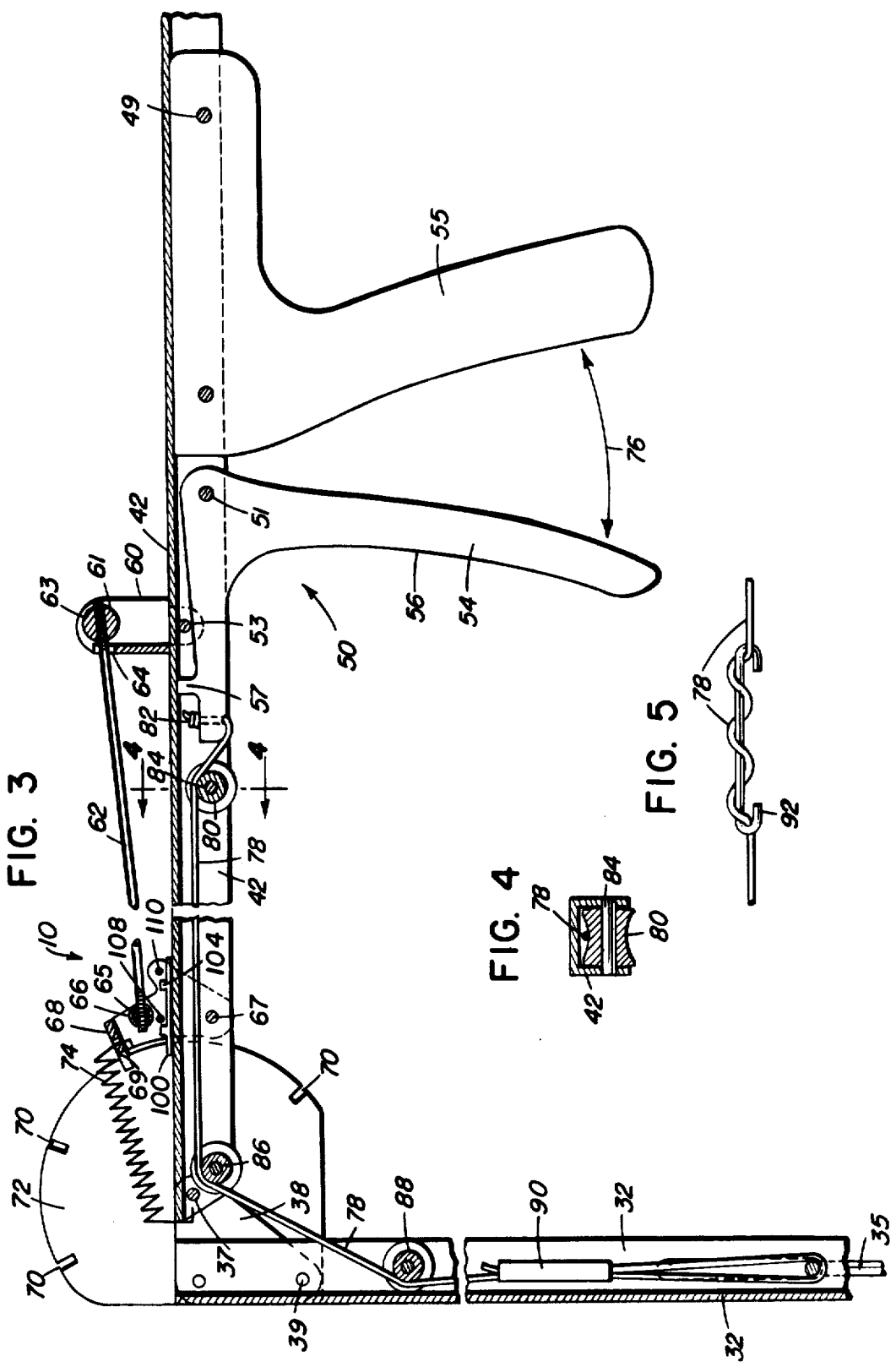

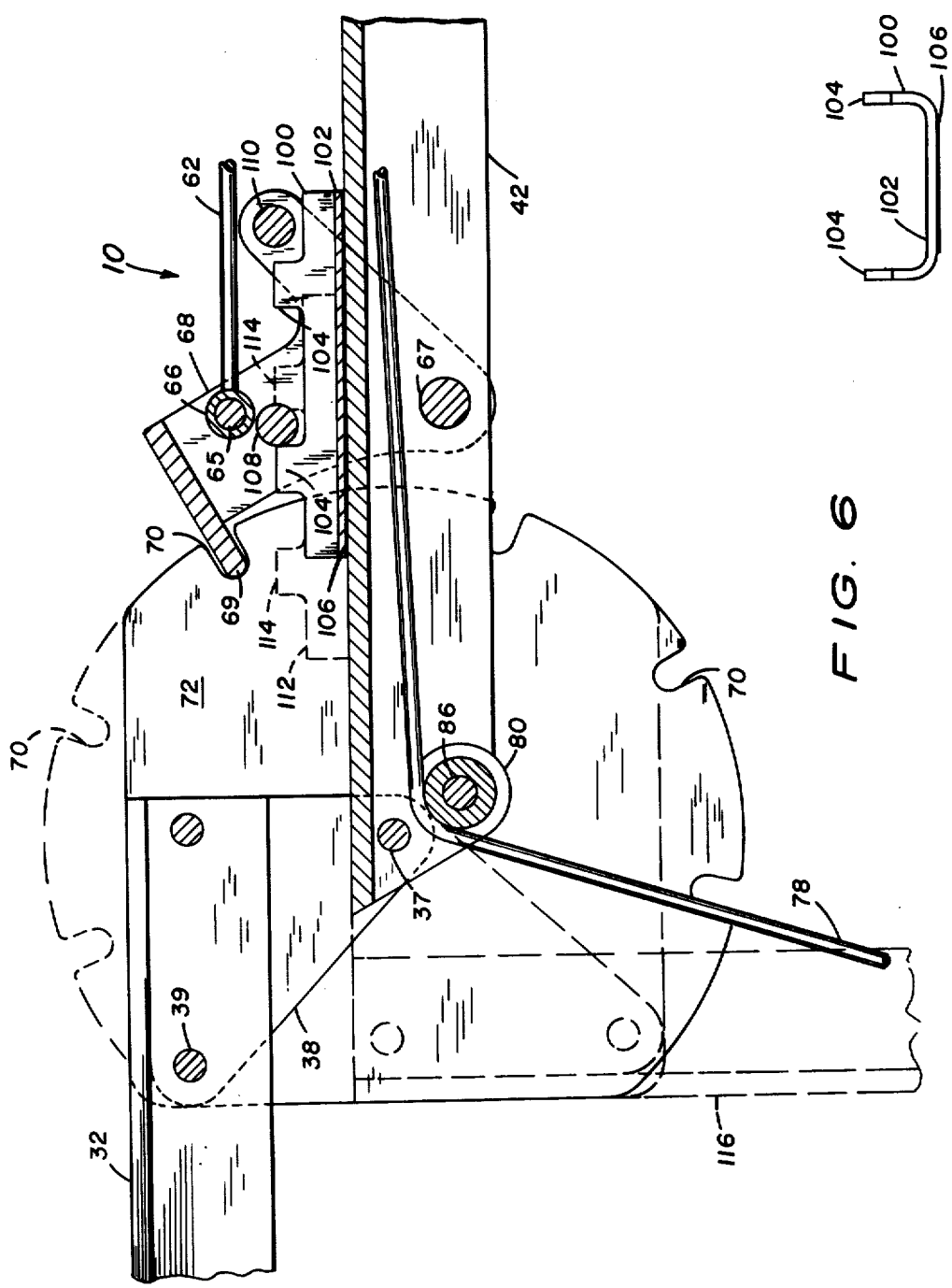
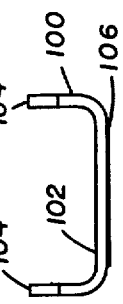

LOCK-TYPE GRIPPING DEVICE FOR HANDICAPPED PERSONS

BACKGROUND AND SUMMARY OF THE INVENTION

The invention relates to devices used by handicapped persons, and in particular to devices that extend the range of the handicapped person's reach. Specifically, it is a safety lock for a gripping device for picking up or lifting items and moving them about the area, with the special lock-type safety means to improve safety when in use.

A need has existed for a locking means for a gripping device that handicapped persons can use conveniently, is light in weight, easy to operate, can be operated with one hand, can be used from a wheelchair, brings an item directly to the user, and which can be used safely. The present invention meets these characteristics.

In the prior art, there have been pick-up type devices, however, the devices have been of rather short reach, provided only a short support at the hand, are of a single direction pick-up with no flexibility to move the object to the user conveniently, often require two hands for operation, and in general, do not have the necessary flexibility and safety or handicapped persons. U.S. Pat. No. 4,231,603, Ser. No. 12,336, filed Feb. 15, 1979, for a "Gripping Device for Handicapped Persons", issued Nov. 4, 1980, invented by the applicant, does have the necessary flexibility for handicapped persons, but does not have a safety means thereon. The present invention provides a lock-type safety means for the hinge action of the device.

Without the lock-type safety means, a user may inadvertently depress a thumb lever control when the device is in a raised or overhead position and be injured as the forward arm section folds downwardly, possibly with an object that has been picked up. The lock-type safety means prevents the accidental release.

It is, therefore, an object of the invention to provide a lock-type safety means for gripping device for handicapped persons that is light in weight.

It is another object of the invention to provide a lock-type safety means for a gripping device for handicapped persons that may be operated with one hand.

It is also an object of the invention to provide a lock-type safety means for a gripping device for handicapped persons that has a capability of bringing the lifted object back to the user.

It is still another object of the invention to provide a lock-type safety means for gripping device for handicapped persons that has a long arm support capability.

It is yet another object of the invention to provide a lock-type safety means for a gripping device for handicapped persons that can be operated from a seated position, such as in a wheel chair.

Further objects and advantages of the invention will become more apparent in the light of the following description of the preferred embodiments.

BRIEF DESCRIPTION OF THE DRAWINGS

FIG. 1 is a perspective view of a gripping device for handicapped persons;

FIG. 2 is a side view of a gripping device for handicapped persons showing one method of picking up an object;

FIG. 3 is an enlarged partial section view on line 3—3—3 of FIG. 1 showing a lock-type safety device thereon;

FIG. 4 is a cross section view of a cable and roller support on line 4—4 of FIG. 3.

FIG. 5 is a slack take-up means for a cable on a gripping device for handicapped persons;

FIG. 6 is a partial cross sectional view, similar to FIG. 3, but with a portion of components rotated;

FIG. 7 is an end view of a locking block for a gripping device for handicapped persons.

DESCRIPTION OF THE PREFERRED EMBODIMENT

Referring to the drawings and particularly to FIGS. 3 and 6, a new and improved lock-type safety means for a gripping device for handicapped persons is shown at 10.

The gripping device 10, which is the gripping device of the aforementioned U.S. Pat. No. 4,231,603, has four major sections: a double acting jaws section 20, a forward arm section 30, a rearward arm section 40, and a control mechanism 50.

Turning first to the double acting jaws section 20, there are two jaws 22 and 24 that are hinged together by connector 23. The connector 23 permits the jaws 22 and 24 to swing together and to open in a scissor-like fashion at the connector 23.

The connector 23 may be a bolt and nut, a double headed rivet-like pin, a pin with a retaining means, or any similar connecting means that can be brought to holding position without compacting the jaws 22 and 24 so tightly together that freedom of scissor-like movement is prevented.

Continuing with the structure at the connector 23, a yoke-like holding bracket is formed to hold the jaws 22 and 24 with the connector 23 in an aligned position with forward arm section 30. Said yoke-like holding bracket consists of a top or outer bracket piece 26 and a lower or inner bracket piece 28. The yoke-like bracket is formed by connecting the lower or inner bracket piece 28 to the top or outer bracket piece 26 by suitable means 27, then fastening the fabricated yoke-like bracket with suitable means 29 within the end portion of the forward arm 32 of the forward arm section 30.

To provide ease of scissor-like action while maintaining sufficient rigidity between jaws 22 and 24, Teflon washers are placed between top bracket piece 26 and jaw 22, between jaws 22 and 24, and between jaw 24 and lower bracket 28.

A single wire spring 35, passing through slot 34 in the forward arm 32, has a right angle bend 36 to maintain the relative position of the spring 35 centered in the slot 34 in relation to the forward arm 32. The two free ends of spring 35 connected to the inboard ends 21 of jaws 22 and 24 by providing hooked ends on said spring 35 and passing hooked ends through suitable clearance holes in the inboard ends 21 of jaws 22 and 24. Said hooked ends of spring 35 may be further bent to retain them in place, upsetting the ends of spring 35 to retain them in place, providing a nut on said ends, or by any other suitable means.

it is to be noted that jaws 22 and 24 are shown in FIG. 1 as being fabricated of two flat pieces 17 and 19 with spacers 18 separating them. However, it is to be understood that, instead of said flat pieces 17 and 19 spaced apart by spacers 18, the jaws 22 and 24 may be a single solid bar configured the same as flat pieces 17 and 19, or a channel or "T" or other similar shape and configured to the shape of said flat pieces 17 and 19. The interior gripping area or surface of jaws 22 and 24 is lined or covered with a plastics, rubber-like material or other composition material (not shown on drawing) to enhance the pick-up characteristics of the double acting jaws section 20. The lining may be dimpled, serrated, or otherwise surface treated, molded, or worked to provide a better gripping surface.

The forward arm 32 is connected to the rearward arm 42 by a pair of gusset plates 38, one gusset plate 38 on each side of forward arm 32. Gusset plates 38 are rigidly attached to forward arm 32 by suitable means at two points of said gusset. The third point of said gusset is used for a pin 37 that serves as a pivot point about which the forward arm 32 and the rearward arm 42 rotate within a fixed or restricted arc in relation to each other and by which said forward arm 32 and rearward arm 42 are pivotally connected to each other.

The rearward arm 42 extends beyond the control mechanism 50 a sufficient distance so that the rearmost end 44 is near the user's elbow. A plug cap 45 is inserted in the rearmost end 44 of the rearward arm 42.

An arm loop 46 is pivotally connected to the rearmost end 44 near the plug cap 45. The arm loop 46 is a more or less rigid wire-like structure configured in a more or less semicircular shape into which the arm near the elbow is rested while the hand grips the control mechanism 50. The arm loop 46 is covered with a plastics or rubber-like material for comfort of the user and for enhancing the holding snugness on the arm.

The arm loop 46 is shown installed in the rearmost end 44 of the rearward arm 42 for a right-handed user. The arm loop 46 may be installed from the opposite side of rearward arm 42 for a left-handed user. The arm loop 46 is retained in place in the rearward arm 42 by suitable means, such as pinching the end where it protrudes through the rearward arm 42, or upsetting the end, threading the end and adding a nut or other similar and suitable means.

The right hand 48 of a user is shown in dotted lines in FIG. 2, with fingers and thumb on the control mechanism 50, described hereinafter, and the arm 48 near the elbow resting in the arm loop 46 as hereinbefore mentioned. The arm loop 46 steadies the gripping device 10 when it is in use by having the effect of making the gripping device 10 an extension of the users arm 48. The arm loop 46 takes part of the strain off of the wrist of the user when picking-up or lifting a heavy object.

Turning now to the control mechanism 50, a general view is seen in FIGS. 1 and 2 with a detailed cross section shown in FIG. 3.

As shown in FIG. 2, the control mechanism 50 is arranged for a right handed person. The thumb lever 52 for control of the relative positions of forward arm 32 and rearward arm 42 to each other, is shown in a position for a right-handed person. The thumb lever 52 is pivotally connected to the rearward arm 42 by a pin 53. A thumb lever for a left handed user will be a mirror image of thumb lever 52 which will then be installed on the oppisite side of rearward arm 42 from that shown in FIGS. 1 and 2.

Describing now the control mechanism 50, in addition to the forementioned thumb lever 52, a trigger 54 and palm grip 55 make up the basic control structure, however, these basic control structure elements cause the control through other connected elements as hereinafter described.

The palm grip 55 is rigidly affixed to the rearward arm 42, which is channel-like, by fitting the horizontal portion of palm grip 55 within said channel-like rearward arm 42 and securing it in place by at least two suitable means 49.

Trigger 54 is pivotally connected to the rearward arm 42 by a pin 51. Trigger 54 may have a smooth finger surface 56, or it may be finger grip formed (not shown). Trigger 54 has a clearance stop 57 to clear pin 53.

Trigger 54 and palm grip 55 may be wood, metal, plastics, fiber, or any other suitable material.

Turning now to the connected elements of the control mechanism 50 that are connected to the thumb lever 52 and the trigger 54 for operating the double acting jaws 20 and the hinged relationship of the forward arm 32 to the rearward arm 42, the thumb lever 52 control system will be described first, followed by the trigger 54 control system.

Thumb lever 52 has a vertical portion 60 which acts similar to a bell crank when the thumb lever 52 is depressed. As thumb lever 52 is depressed the vertical portion 60 swings toward the rearmost end 44 in a small arc. As the vertical portion 60 swings in an arc it draws with it the connecting rod 62. The connecting rod 62 is connected to the center of a first pin 61 which is free to move in the journal-like holes 63 in the two side flanges of the vertical portion 60. The connecting rod 62 may be connected to said first pin 61 by threaded or other means. A slot 64 in the face of vertical portion 60 maintains connecting rod 62 in a more or less central position and thereby prevents said first pin 61 from escaping from the journal-like holes 63 in the two side flanges of the vertical portion 60.

The distal end of connecting rod 62 connects to a second pin 65 in a manner similar to the connection to said first pin 61. Second pin 65 has a sleeve 66 over it on the inside of yoke-like indexing detent 68. It is to be noted that the sleeve 66 is one method by which second pin 65 can be kept in place in yoke-like indexing detent 68. The connecting rod 62 can also be passed through a suitable aperture in yoke-like indexing detent 68 by a suitable bend and hook on the end of connecting rod 62.

The yoke-like indexing detent 68 is pivotally mounted on the rearward arm 42 by a pin 67. As the yoke-like indexing detent 68 swings through an arc similar to the aforementioned description for vertical portion 60 when the thumb lever 52 is depressed, because the connecting rod 62 then pulls the yoke-like indexing detent 68 rearward, the indexing finger 69 (on the yoke-like indexing detent 68) is withdrawn from whichever indexing slot 70 it is located at the time. It is to be noted that a plurality of indexing slots 70 are located in the index plate 72. Each index slot 70 provides a specific location and angle for the forward arm 32 in relation to the rearward arm 42. The index plate 72 is connected to the outside of one of the gusset plates 38 on the forward arm 32 by the same connecting means 39 used to connect gusset plates 38 to the forward arm 32.

A tension spring 74, connected between the horizontal portion of the yoke-like indexing detent 68 and the forwardmost distal end of the rearward arm 42, maintains the indexing finger 69 in the selected index slot 70 until thumb lever 52 is depressed to withdraw it.

In actual use, if the forward arm 32 is in the downward position it may be brought to the upward position merely by swinging the gripping device 10 with the thumb lever 52 depressed, so that the forward arm 32 swings upward, and then quickly releasing the thumb lever 52 as the forward arm 32 reaches the top of the swing, so that the indexing finger 69 drops into an index slot 70 as it passes and holds the forward arm 32 in that position.

An alternative method is to press the double acting jaws section 20 against the floor or some object with the thumb lever 52 depressed so that the forward arm 32 is brought into line with the rearward arm 42. The thumb lever 52 is them released so that the indexing finger 69 can drop into the nearest index slot 70.

When an item is retrieved at a distance, as hereinafter described for the trigger 54 operation, the item or object can be brought to within reach of the user by depressing the thumb lever 52 so that the forward arm 32 drops down to a position at and close to the user. At this point the object can be taken from the jaws section 20 with the free hand, or the object can be dropped into the lap of the user if only one hand is operative or available. However, it is at this point that the lock-type safety means 10 is used as described hereinafter.

A "U" shaped slidable locking block 100 is the lock-type safety means 10 for controlling the inadvertent depressing of thumb lever 52.

The locking block 100 consists of a "U" shaped body member 102, a pair of protrusions 104 on each upstanding leg of the "U" shaped body member 102, and a very thin coating or cover of low friction material 106, such as Teflon, suitably applied or adhered to the bottom side of the base of the "U" shaped body member 102, as shown in FIG. 6 and 7.

The locking block 100 operates in conjunction with two pins 108 and 110 in the yoke-like indexing detent 68. The function of the two pins in relation to the locking block 100 by functional name is retaining pin 108 and locking pin 110.

The locking block 100 rests freely upon the upper side of rearward arm 42. Locking block 100 is not affixed to the rearward arm 42, but is slidably and removably placed thereon with the low friction material 106 interfacing with the surface of the rearward arm 42. The locking block 100 is slightly narrower in width than the width of rearward arm 42 to permit the locking block 100 to freely and slidably move between the sides of the yoke-like indexing detent 68.

As can be seen in FIG. 6 the locking block cannot escape from its position on the rearward arm 42 and between the yoke-like indexing detent 68, as retaining pin 108, which is located between the upstanding protrusions 104 and slightly above the "U" shaped body member 102, prevents the locking block 100 from escaping by sliding out of the confined movement area.

When the gripping device with lock-type safety means 10 is in raised position to pick up an object, as in FIG. 2, or as illustrated in maximum relation of forward arm 32 to rearward arm 42 as shown in FIG. 6 and then raised as in FIG. 2, the raising of the gripping device with lock-type safety means 10 permits the freely sliding locking block 100 to slide rearward to a position as shown in FIG. 6. In this position the thumb lever 52 cannot be depressed as locking pin 110 will come to rest immediately on end portion of "U" shaped body member 102 before the detent indexing finger 69 withdraws from the index slot 70, thus blocking the accidental or inadvertent depressing of thumb lever 52 while the gripping device with lock-type safety means 10 is in a raised position. Thus safety is preserved by preventing the release of the forward arm 32 and any load it is carrying, whereby it would swing down rapidly and endanger the user.

In order to release the forward arm 32, the gripping device with lock-type safety means 10 must be lowered so that the forwardmost end of the rearward arm 42 is in a somewhat downward position in relation to the rearmost end. In this position the freely sliding locking block 100 will slide forward to the position shown by ghost lines 112 in FIG. 6 for locking block 100, the protrusions 104 in the latter position are shown by ghost lines 114. Thus, retaining pin 108 still prevents the locking block 100 from escaping the confined position, and locking pin 110 is now free to move downward as thumb lever 52 is depressed to withdraw the indexing finger 69 from the index slot 70.

Yoke-like indexing detent 68 is somewhat "L" shaped like a bell crank, so that as the depressing of thumb lever 52 takes place the connecting rod 62 pulls the yoke-like indexing detent 68 into an arc-like movement around pin 67 and locking pin 110 moves in an arc-like movement in a downward direction.

As the gripping device with lock-type safety means 10 has been lowered in order to move the locking block 100 forward, the user can release the forward arm 32 by depressing the thumb lever 52; in the lowered position the user can control the swing of the forward arm in a safe manner. The forward arm 32 is shown in ghost lines 116 in FIG. 6 in a partially returned position.

Turning now to the trigger 54 operation to control the operation of the double acting jaws 20, refer to FIGS. 1, 2, and 3.

When the trigger 54 is pulled back toward the palm grip 55, the double acting jaws 20 will close, as hereinafter described. The spring 35, which tends to spring outward, holds the double acting jaws 20 in an open position until the trigger 54 is pulled in order to close the double acting jaws 20. The spring 35 pushes the inboard ends 21 of the jaws 22 and 24 in an outward direction and thus, maintains the double acting jaws 20 in an open position.

When the trigger 54 is pulled and moved toward the palm grip 55, as noted by the arrows at 76, the cable 78 is pulled across the pulley idler roller 80. The cable 78 is anchored to the trigger 54 by a suitable means 82. The pulley idler roller 80 turns freely on a pin-type shaft 84. The cable 78 passes over other similar rollers 86 and 88. A typical roller is shown in FIG. 4.

The end of the cable 78 looped around the spring 35 where the spring 35 passes through the forward arm 32 at the slot 34. The cable 78 is then doubled back upon itself and suitably clipped to itself by a clamp-like clip 90.

Because slack or stretching may occur in the cable 78, a small "C" type take-up wire 92 is provided within the channel side of the forward arm and about which the slack portion is wrapped to make the cable taut. The "C" take-up wire 92 is shown in FIG. 5, but is not shown in FIG. 3.

It is to be noted that the cable may be cord, nylon, linen, steel, or any other suitable material.

Thus, as the trigger 54 is pulled, the cable 78 is drawn back across the pulley idler rollers 80, 86, and 88, which in turn pulls on spring 35, which then pulls the inboard ends 21 of the jaw flat pieces 22 and 24 to the rear and the scissors-like action closes the jaws 22 and 24 to clamp around or on the object to be picked up or lifted.

The gripping device with lock-type safety means 10 can be used to pick up a can 95 from a shelf 97. It can also pick up a coin or other small objects from a floor.

It is to be noted that the cross section of the forward arm 32 and the rear arm 42 are shown as channel shaped, other cross section configurations may be used.

Likewise the cross section of the jaws 22 and 24 may be varied as a lamination of flat pieces, a solid piece, a tubular cross section, or other similar shape.

A magnet may be included as part of a built in structure at the ends of the jaws 22 and 24 for retrieving small ferrous metal parts.

As can be readily understood from the foregoing description of the invention, the present structure can be configured in different modes to provide the ability to have a lock means on a gripping device for a handicapped person to pick up objects.

Accordingly, modifications and variations to which the invention is susceptible may be practiced without departing from the scope and intent of the appended claims.

What is claimed is:

1. In a gripping device to aid handicapped persons in reaching and picking up objects, said gripping device having a gripping means, a forward arm member, a rearward arm member, and a control mechanism, a lock-type safety means, comprising:
    a forward arm member;
    a rearward arm member, said rearward arm member being pivotally connected to said forward arm member;
    a control mechanism, said control mechanism being movably affixed to said rearward arm member, said control mechanism controlling the pivotal movement of said forward arm member toward the user and the gripping action of the device, said control mechanism having a remote thumb control means, said remote thumb control means controlling the activation of the pivotal operation of said forward arm member pivotally connected to said rearward arm member; and
    a locking means, said locking means being slidably positioned on said rearward arm member, said locking means automatically releasably engaging said control mechanism and locking it in a predetermined position when said rearward arm member is raised to an elevated position, said locking means serving as a safety device to make said remote thumb control means inoperative, said locking means also being capable of releasably disengaging from said control mechanism to permit said thumb control to function in controlling said activation of said pivotal operation of said forward arm.

2. A lock-type safety means as recited in claim 1, wherein said locking means locks said remote thumb control means in position when said forward arm member is in an elevated position.

3. A lock-type safety means as recited in claim 2 and additionally, a low-friction means, said low-friction means being a low-friction material, said low-friction means being affixed to said locking means in a location and a position so as to interface with said rearward arm member when said locking means is slidably positioned on said rearward arm member.

4. A lock-type safety means as recited in claim 3, wherein said low-friction material is Teflon.

5. A lock-type safety means as recited in claim 3, wherein said locking means consists of a body member, said body member having a first side and a second side, said body member having a pair of upstanding protrusions on said first side thereof, said low-friction means being affixed to said body member on said second side thereof, opposite to said pair of upstanding protrusions, and additionally at least two pin means, said two pin means being positioned and affixed within said control mechanism, said two pin means being a retaining pin and a locking pin, respectively, said retaining pin means serving to retain said locking means within said control mechanism when said locking means is positioned on said rearward arm member, said locking pin means serving to position said locking means when releasably engaging said control mechanism.

6. In a gripping device to aid handicapped persons in reaching and picking up objects, said gripping device having a gripping means, a forward arm member, a rearward arm member, and a control mechanism, a lock-type safety means, comprising:
    a forward arm member;
    a rearward arm member, said rearward arm member being pivotally connected to said forward arm member;
    a control mechanism, said control mechanism being movably affixed to said rearward arm member, said control mechanism controlling the pivotal movement of said forward arm member toward the user and the gripping action of the device, said control mechanism having a remote thumb control means, said remote thumb control means controlling the activation of the pivotal operation of said forward arm member pivotally connected to said rearward arm member;
    a locking means said locking means being slidably positioned on said rearward arm member, said locking means automatically releasably engaging said control mechanism and locking it in a predetermined positioned when said rearward arm member is raised to an elevated position, said locking means serving as a safety device to make said remote thumb control means inoperative, said locking means also being capable of releasably disengaging from said control mechanism to permit said thumb control to function in controlling said activation of said pivotal operation of said forward arm, said locking means locks said remote thumb control means in position when said forward arm member is in an elevated position, said locking means automatically unlocks said remote thumb control means when said forward arm member is changed to a lowered position, said locking means having a body member, said body member having a first side and a second side, said body member having a pair of upstanding protrusions on said first side thereof;
    a low-friction means, said low-friction means being a low-friction material, said low-friction means being affixed to said second side of said body member, opposite to said pair of upstanding protrusions, said low-friction means thereby being in a position so as to interface with said rearward arm member when said locking means is slidably positioned on said rearward arm member; and
    two pin means, said two pin means being positioned and affixed within said control mechanism, said two pin means being a retaining pin and a locking pin respectively, said retaining pin means serving to retain said locking means within said control mechanism when said locking means is positioned on said rearward arm member, said locking pin means serving to position said locking means when releasably engaging said control mechanism.

* * * * *